July 14, 1970 W. BECKER 3,520,176
SYSTEM FOR DETECTION OF LEAKS IN VESSELS
Filed April 8, 1968 3 Sheets-Sheet 3
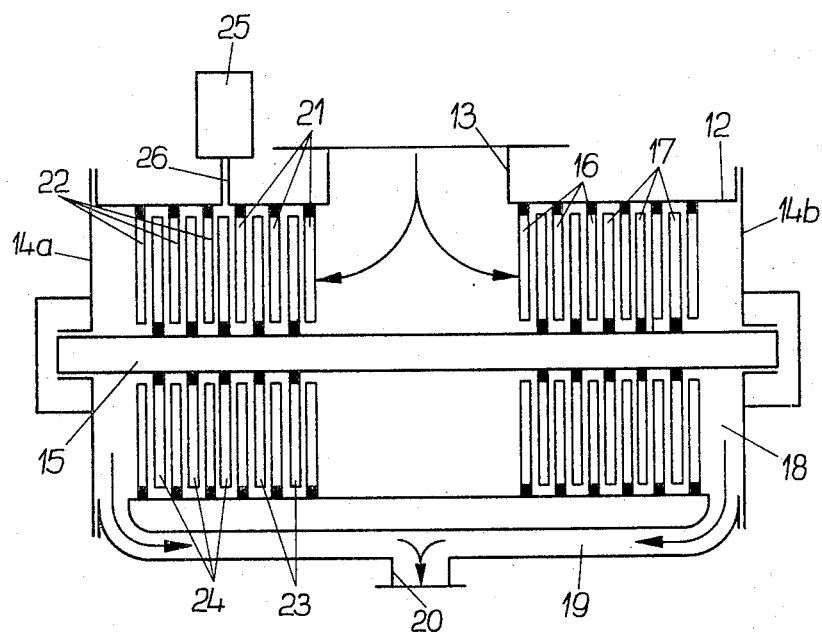
Inventor
Willi Becker
By
Watson, Cole, Grindle + Watson
Attys.

United States Patent Office 3,520,176
Patented July 14, 1970

3,520,176
SYSTEM FOR DETECTION OF LEAKS IN
VESSELS
Willi Becker, Ehringshausen Kreis Wetzlar, Germany,
assignor to Arthur Pfeiffer Hochvakuumtechnik
GmbH, Wetzlar, Germany, a corporation of Germany
Filed Apr. 8, 1968, Ser. No. 719,408
Claims priority, application Germany, Apr. 12, 1967,
P 41,872
Int. Cl. G01m 3/20
U.S. Cl. 73—40.7                                       6 Claims

ABSTRACT OF THE DISCLOSURE

A system for the detection of leaks in vessels by means of a test gas penetrating through the leaks into the vessel and being indicated by means of a mass spectrometer being evacuated by at least one pump, the mass spectrometer being connected with the inlet side of a molecular pump building up a small pressure ratio for the test gas and a large pressure ratio for air and other gases which are heavier than the test gas.

---

This invention relates to an arrangement for searching for leaks in vacuum vessels and tubings with the aid of a test gas, for example, helium, flowing through the leak into the evacuated vessel, with the aid of a mass spectrometer and of at least one pump evacuating the vessel.

For the testing of vessels and other constructions with regard to their tightness, instruments of various types are used for searching for leaks. For providing the existence of very small quantities of leakage, one uses instruments which operate in accordance with the principle of mass spectrometers. In the case of such testing process, the part that is to be checked is evacuated by means of vacuum pumps to a low pressure of $10^{-4}$ to $10^{-5}$ torr. According thereto a test gas, as a rule helium, is blown from the outside against the part that is to be tested, and the test gas will penetrate through leaks into the inside of the vessel. Very small quantities of test gas, that have penetrated into the vessel, can be determined by means of a mass spectrometer with which the partial pressures of a gas mixture can be measured.

In order to be able to spot a leak quickly and precisely, it will be necessary that the indicating deflection of the mass spectrometer reacts as quickly as possible to an increase and decrease of a penetrating quantity of leakage gas.

In order to achieve the required decrease in pressure in the vessel that is to be tested, one will have to use, as a rule, two-stage pump systems, which consist for example, of an oil diffusion pump or mercury diffusion pump with series connected cold traps serving as a high vacuum pump and a subsequently added backing pump, such as for example, an oil sealed rotary pump.

So-called halogen leak detectors have also been known which operate at a higher pressure than mass spectrometers. In the case of these halogen leak detectors, it will therefore be possible to connect the indicating device between the high vacuum pump and the backing pump. With that, one will obtain a relatively great sensitivity of the measuring arrangement, since the compression by the high vacuum pump will increase the concentration of the test gas.

The direct connection of a mass spectrometer between the high vacuum pump and the backing pump is generally not possible since mass spectrometers can only operate in the case of a far lower pressure than that which prevails between the high vacuum pump and the backing pump.

The present invention is based on the feature of creating a pump arrangement with which even a mass spectrometer can be attached between the high vacuum pump and the backing pump. The use of a mass spectrometer is possible by the invention even if the vessel that is to be tested is evacuated only by a backing pump, therefore the low pressure required for a mass spectrometer will be reached nowhere in the system.

According to the invention, the object thereof is solved by the fact that at a point where the pressure is higher than the pressure required for the operation of a mass spectrometer, and located in the line serving for the evacuation of the vessel, a tapping has been provided for a turbomolecular pump. A turbomolecular pump is a mechanical high vacuum pump consisting of one or more pressure stage sets situated between the fore-vacuum side and the high vacuum side of the pump, each pressure stage set consisting of several series connected pressure stages, each pressure stage consisting of one disk fastened to the pump shaft and rotating with the same, and of one disk which is fixed and secured in the pump housing. The rotating and stationary disks in known manner have channels or passages extending obliquely to the plane of the disks, see U.S. Pat. No. 2,918,208. The mass spectrometer has been connected on the suction side of the turbomolecular pump, whereby the turbomolecular pump has such a number of stages and such a range of speed, that it will build up only a small pressure ratio for the test gas, but, on the other hand, for air and gasses which are heavier than the test gas it will build up a large pressure ratio. In the case of the use of a system of pumps, consisting of a high vacuum pump and a backing pump, for the evacuation of the vessel, the tapping for the turbomolecular pump has been arranged between the high vacuum pump and the backing pump.

In the case of such a pump arrangement, the required low total pressure is maintained in the mass spectrometer by means of the turbomolecular pump, while penetration of the test gas into the mass spectrometer is impeded only very little. Although the test gas must penetrate counter to the conveying direction of the turbomolecular pump, the sensitivity of the measuring arrangement, as compared to the known arrangement, is increased considerably, since the resistance placed up by the turbomolecular pump against backstreaming of the test gas will be compensated by far by utilization of the compression ratio of the high vacuum pump. Therefore, the present invention uses that characteristic of turbomolecular pumps which is shown further in the following on the basis of a diagram, namely that said turbomolecular pumps at a given speed have quite different compression ratios for various gases.

Turbomolecular pumps excell, as is well known by a good pumping action with great rigidity and they do not have the disadvantage of contaminating the mass spectrometer by vapors, such as for example, oil vapors. The high vacuum pump too can be a turbomolecular pump.

If the high vacuum pump is a turbomolecular pump, one can unite the turbomolecular pump attached to the mass spectrometer and the said high vacuum pump in one housing, according to a further development of the invention. In the case of such a design of the invention, the high vacuum pump and the turbomolecular pump connected with the mass spectrometer have one common shaft. In the pump housing, both a connection as a suction stub, for the vessel that is to be checked as well as a tapping for the mass spectrometer have been provided. The group of disks of the high vacuum pump has been arranged on one side of the suction stub while the turbomolecular pump, connected in series with the mass spectrometer, is located on the other side of the suction stub and is formed by a group of disks arranged on a common shaft and on a common housing. The suction side of this turbomolecular pump has been sealed against the suction stub. In the case of such a design, one will obtain, constructively speaking, a particularly simple and compact construction. By the saving of pump bearings and other pump elements, the production will be particularly reasonable and inexpensive.

The seal against the suction stub may be a labyrinth packing. It is true that with such a labyrinth packing a penetration of the test gas from the tapping to the suction stub can largely be prevented, however a complete seal is not possible. A complete seal can be achieved, according to a further development of the invention, by the fact that the seal is constituted by further third turbomolecular pump whose disks have been arranged on the common shaft and in the common housing and which has a large pressure ratio at a small pumping speed. Such a turbomolecular pump creates a small flow of gas from the suction stub to the tapping for the mass spectrometer, and therefore prevents any flow in the opposite direction from taking place.

The turbomolecular pump which is series connected with the mass spectrometer preferably has a small pressure ratio at a large pumping speed. As a result thereof, one will achieve that the gas conveyed by the turbomolecular pump serving for the seal between the suction stub and the point of tapping is off quickly and the required low pressure is maintained at the point of tapping.

Further objects of the invention will be apparent from the following description in connection with the accompanying drawings showing two designs given by way of examples and in which.

Figure 1:
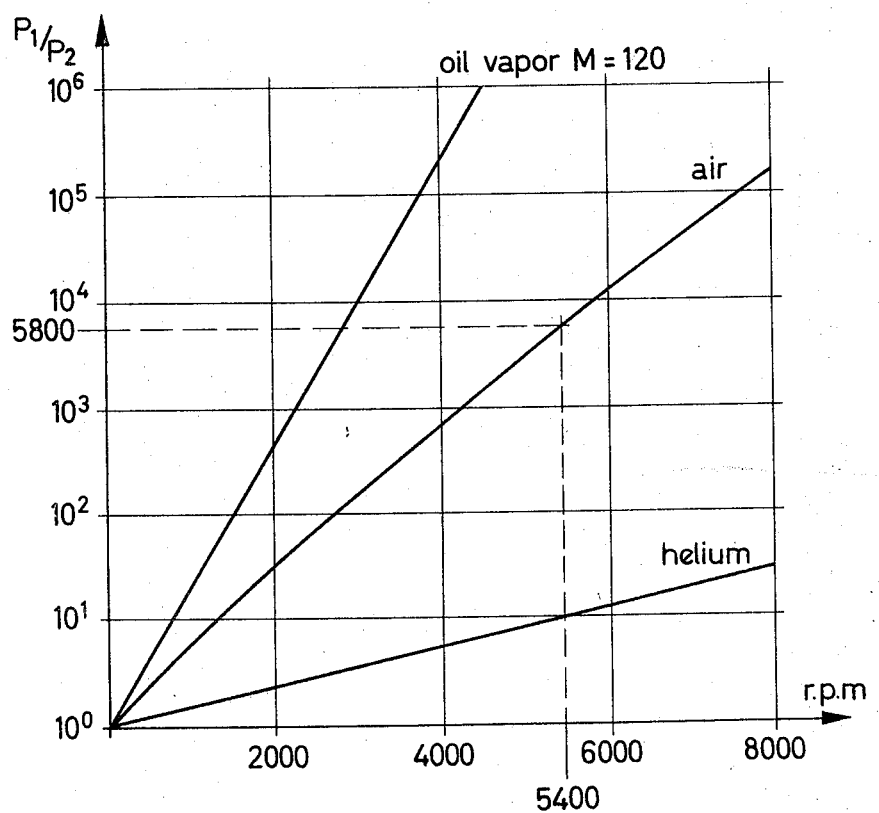
FIG. 1 shows a diagram showing operative functions of turbomolecular pumps.

First of all there is explained the behavior of the turbomolecular pumps which is essential for the invention, on the basis of the diagram according to FIG. 1.

The speed of the pump in terms of revolutions per minute is plotted on the abscissa of the diagram while the pressure ratio $P_1/P_2$ is shown on the ordinate. In this case $P_1$ is the pressure on the outlet pressure side of the pump and $P_2$ is the pressure on the suction side of the pump. The scale on the abscissa is linear while the scale on the ordinate is logarithmic. Three curve lines have been plotted in the diagram, whereby the lowest curve, designated by "helium," is for helium as flow medium, the middle curve designated by "air" is for air and the upper one designated by "oil vapor $M=120$" is for oil vapor with a molecular weight of 120. It is clear from the diagram that the pressure ratios for a certain pump speed vary very greatly. For example, one can read in the case of a number of 5400 revolutions per minute for helium, a pressure ratio $P_1/P_2$ of 10 and for air of about 5800.

Figure 2:
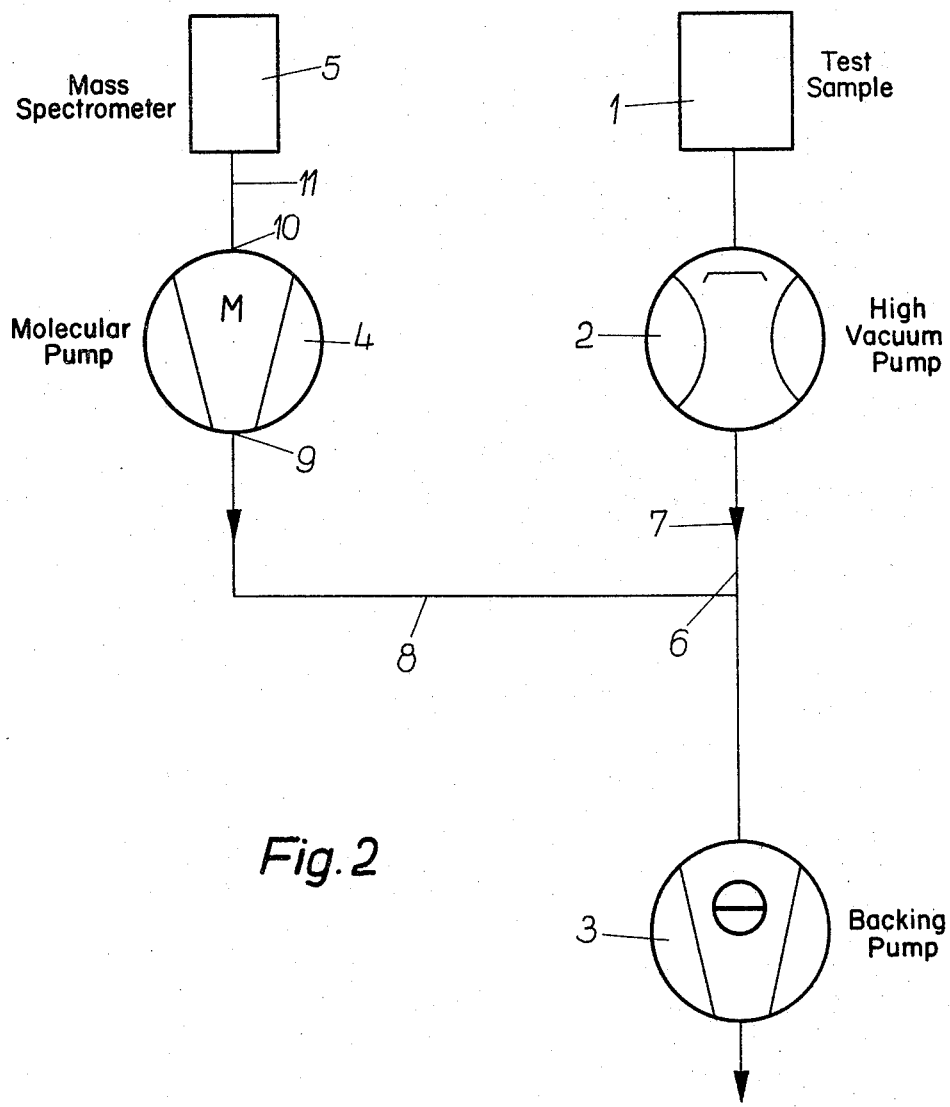
FIG. 2 is a schematic shifting diagram of the pump arrangement according to the invention, and, FIG. 3 shows a diametric section through a combined high vacuum pump for the evacuation of the part that is to be tested and for the connection before the mass spectrometer.

FIG. 2 shows a pump arrangement according to the invention in the form of a diagram of connections; 1 designates the test sample, for example, a vessel which is to be tested for tightness, 2 is the high vacuum pump, 3 the backing pump, 4 a turbomolecular pump and 5 a mass spectrometer. The high vacuum pump 2 can be a diffusion pump and the backing pump 3 a rotary vane pump connected with one another by a connecting line 6. The direction of flow of the gases in the pipe 6 is indicated by an arrow 7 and leads from the pressure side of the high vacuum pump 2 to the suction side of the backing pump 3. A branch line 8, is connected to the connecting pipe 6, which branch line 8 leads to the pressure side 9 of the turbomolecular pump 4. The mass spectrometer 5 is connected to the suction side 10 of the turbomolecular pump 4 by a connecting pipe 11.

The pumps have been dimensioned, for example, in such a manner and are operated at such revolutions per minute that the pump 2 will build up a pressure ratio $P_1/P_2$ of 1000, while the turbomolecular pump 4 operates in such a manner as is the case in the event of a speed of 5400 revolutions per minute singled out in the case of the diagram, FIG. 1. In that case, the partial pressure of the test gas helium is greater by the factor 100 in the mass spectrometer than it is in the test vessel 1. This ratio is obtained from the division of the pressure ratio of the pump 2 of 1000 by the pressure ratio of the turbo-molecular pump 4 for the test gas helium, which pressure ratio, in the case assumed in the diagram according to FIG. 1, amounts to 10. However, the pressure ratio for air, likewise in the case of the example singled out in the diagram, is 5800, so that the air is largely kept away from the mass spectrometer. Consequently, the test gas helium can penetrate in essentially larger quantities to the mass spectrometer 5 than would be the case in the event of a direct connection of the mass spectrometer with the test vessel 1.

FIG. 3 shows schematically a pump, which is particularly advantageous for use in accordance with the invention, for an arrangement which is similar to the pump arrangement according to FIG. 2. This pump has a housing 12 with a suction stub 13, for the test vessel, for example, a container which is to be checked for tightness. The housing has been closed by means of lids 14a and 14b at its ends. The ends of a pump shaft 15 are mounted in the lids 14a and 14b. In the housing 12, to the right of the suction stub 13, stator disks 16 have been arranged with which rotor disks 17, attached on the pump shaft 15, cooperate. The disks 16 and 17 together form the high vacuum pump whose suction side is located at the suction stub 13 and whose pressure side, viewed in the drawing, is at the right. The pressure space has been designated by 18. The pipe 19 leads from the pressure space 18 to a connection piece or section 20 for the backing pump, which has not been shown in FIG. 3 and which can be a rotary vane pump, for example, corresponding with the diagram according to FIG. 2.

To the left of the suction stub 13, stator disks 21 and 22 have been fixed in the housing, with which rotor disks 23 and 24, attached on the pump shaft 15, cooperate. The stator disks 21 and the rotor disks 23 together constitute a turbomolecular pump with a large pressure ratio $P_1/P_2$ and a small pumping speed, while the disks 22 and 24 together form a turbomolecular pump with a small pressure ratio $P_1/P_2$ and a large pumping speed.

A mass spectrometer has been attached by a tapping pipe 26 between the disk pairs 21/23 or 22/24.

In the case of the arrangement according to FIG. 3, the turbomolecular pump which is series connected with the mass spectrometer 25, and consisting of the disks 22/24, fulfills the same task as did the pump 4 according to FIG. 2. On the other hand, the turbomolecular pump consisting of the pairs of disks 21/23 forms a seal against the suction stub 13. This part of the pump conveys a small quantity of gas in the direction of the mass spectrometer. By this flow of gas one will prevent the backstreaming of the test gas, which has penetrated to the mass spectrometer, in the direction of the suction stub. The development of this pump element is such that it will have a large pressure ratio while having a low pumping speed and results in a particularly good blocking action and makes it possible for the turbomolecular pump to produce the necessary low pressure in the mass spectrometer from the disks 22/24.

The pump arrangement according to FIG. 2 operates as follows. Upon starting of the system, the high vacuum pump 2 will first of all evacuate the vessel 1, which is to be tested. The gas conveyed by the high vacuum pump 2 is brought up to atmospheric pressure by the backing pump 3. With this two-step pump system a very low pressure can be achieved in the vessel 1. The turbomolecular pump first of all establishes a lower pressure in the mass spectrometer 5. The gases contained in the mass spectrometer are moved into the connecting pipe between the high vacuum pump 2 and the backing pump 3. In the case of the testing of the vessel 1, test gas, preferably helium, is blown by means of a jet against its outside wall. Small quantities of helium are sucked into the inside of the vessel 1 at the leak spots. This helium which has penetrated is conveyed by the high vacuum pump 2 into the connection pipe 6. The helium in the connection pipe 6 can now penetrate counter to the direction of conveyance of the turbomolecular pump 4, to the mass spectrometer 5. It is true that the turbomolecular pump 4 also strives to keep away the helium from the mass spectrometer 5, however this is not entirely successful, since the turbomolecular pump has been constructed in such a manner and operates with such an operational speed that for the test gas, it will build up only a very small pressure ratio in comparison to the pressure ratio resulting in the case of the conveyance of air. In any case, much more helium will penetrate to the mass spectrometer 5 than would be the case if the mass spectrometer were connected with the connection pipe between the test vessel 1 and the high vacuum pump 2. The high pressure in the connection pipe 6, therefore, does not compensate for the resistance of the turbomolecular pump 4 but it causes the addition of an essentially larger quantity of test gas to the mass spectrometer than would be the case in the event of the low pressure on the suction side of the high vacuum pump 2, although in that case it would not be necessary to overcome the resistance of a turbomolecular pump. The turbomolecular pump 4 is operated at precisely such a speed, so that the mass spectrometer would be sufficiently evacuated. One would not strive for a further lowering of the pressure because, as a result thereof, the resistance against penetration of the test gas would also be increased.

In the case of the structure according to FIG. 3, the test vessel is essentially evacuated by the turbomolecular pump which consists of the pairs of disks 16/17. Only a small portion will be drawn in by the turbomolecular pump consisting of the pairs of disks 21/23. The flow in the pump 21/23 prevents any possibility of the test gas penetrating from the mass spectrometer to the turbomolecular suction stub. The pump consisting of the disks 22/24 has been constructed in such a manner that, at the place of tapping, the low pressure will be achieved, which is required for operation of the mass spectrometer 25. The test gas penetrates essentially from the pressure side 18 of the pump 16/17 to the mass spectrometer. A small portion is also conveyed by the pump 21/23.

The pump according to FIG. 3 is designed in such a manner that the pump element 16/17 will have the necessary pumping speed and the necessary pressure ratio, whereby, as a rule, high number of revolutions are used. Thus, the speed for the pumps 21/23 and 22/24 have been given. In order to achieve the necessary characteristics, the disks 21/23 or 22/24 must be developed properly and the number of stages must be selected correspondingly.

In place of the pump element 21/23, it would also be possible to use a packing, for example, a labyrinth packing.

As previously explained in the description, the invention will also be of advantage whenever the test vessel 1 will be evacuated only by a rotary pump. In that case the low pressure required for operation of a mass spectrometer will not be achieved at all. If now a mass spectrometer is attached in the manner as shown in FIG. 2, whereby pump 2 is omitted, then one will achieve the required low pressure in the mass spectrometer without essentially impeding the penetration of the test gas to the mass spectrometer by means of the turbomolecular pump 4.

I claim:

1. System for the detection of leaks in vacuum vessels with a mass spectrometer and with the aid of a test gas as helium, flowing through leaks into an evacuated vessel, comprising at least one pump to evacuate the vessel, a turbomolecular pump consisting of several series connected pressure stages, each pressure stage consisting of one rotating and one stationary disk, each disk having channels extending obliquely to the plane of the disk, which turbomolecular pump is connected to one point of the pipe serving for the evacuation of the vessel where the pressure is higher than the pressure required for the operation of the mass spectrometer, means connecting the mass spectrometer at the suction side of the turbomolecular pump whereby the turbomolecular pump has a number of stages and such a range of speed that for the test gas, it will only build up a small pressure ratio, and for other gases which are heavier than the test gas, it will build up a large pressure ratio.

2. System according to claim 1, in which the evacuating pumping means is a group consisting of a high vacuum pump and a backing pump, the connection for the turbomolecular pump evacuates the mass spectrometer is provided between the high vacuum pump and the backing pump.

3. System according to claim 2, in which the high vacuum pump is a turbomolecular pump.

4. System according to claim 1, in which the turbomolecular pump serving as a high vacuum pump and the turbomolecular pump evacuating the mass spectrometer have a common shaft and a common housing, the housing having a connection for the vessel to be tested and another connection for the mass spectrometer, the group of discs forming the turbomolecular pump as the high pump being arranged at one side of the connection for the vessel and the group of discs forming the turbomolecular pump which is connected with the mass spectrometer is provided on the other side of the said connection, whereby both turbomolecular pumps are on a common shaft and there is a seal between the connection for the vessel and the connection for the mass spectrometer.

5. System according to claim 4, in which as seal between the connection for the mass spectrometer and the connection for the tank, there are further discs on the common housing forming a turbomolecular pump creating a small flow of gas from the connection for the tank to the connection for the mass spectrometer and preventing practically any backstreaming of gas from the connection for the mass spectrometer to the connection for the tank.

6. System according to claim 4, in which the turbomolecular pump which is connected with the mass spectrometer, has a small pressure ratio for the test gas and a large pumping speed.

References Cited

UNITED STATES PATENTS

| | | | |
|---|---|---|---|
| 3,227,872 | 1/1966 | Nemeth | 250—41.9 |
| 3,342,990 | 9/1967 | Barrington et al. | 73—40.7 X |
| 3,355,587 | 11/1967 | Jenckel | 73—40.7 X |
| 3,385,102 | 5/1968 | Briggs | 73—40.7 |
| 3,416,359 | 12/1968 | Durbin et al. | 73—40.7 |

S. CLEMENT SWISHER, Primary Examiner

U.S. Cl. X.R.

250—41.9